Oct. 3, 1961 J. L. QUINN ET AL 3,002,283
CARD WIDTH SENSING DEVICE
Filed July 10, 1957 7 Sheets-Sheet 2

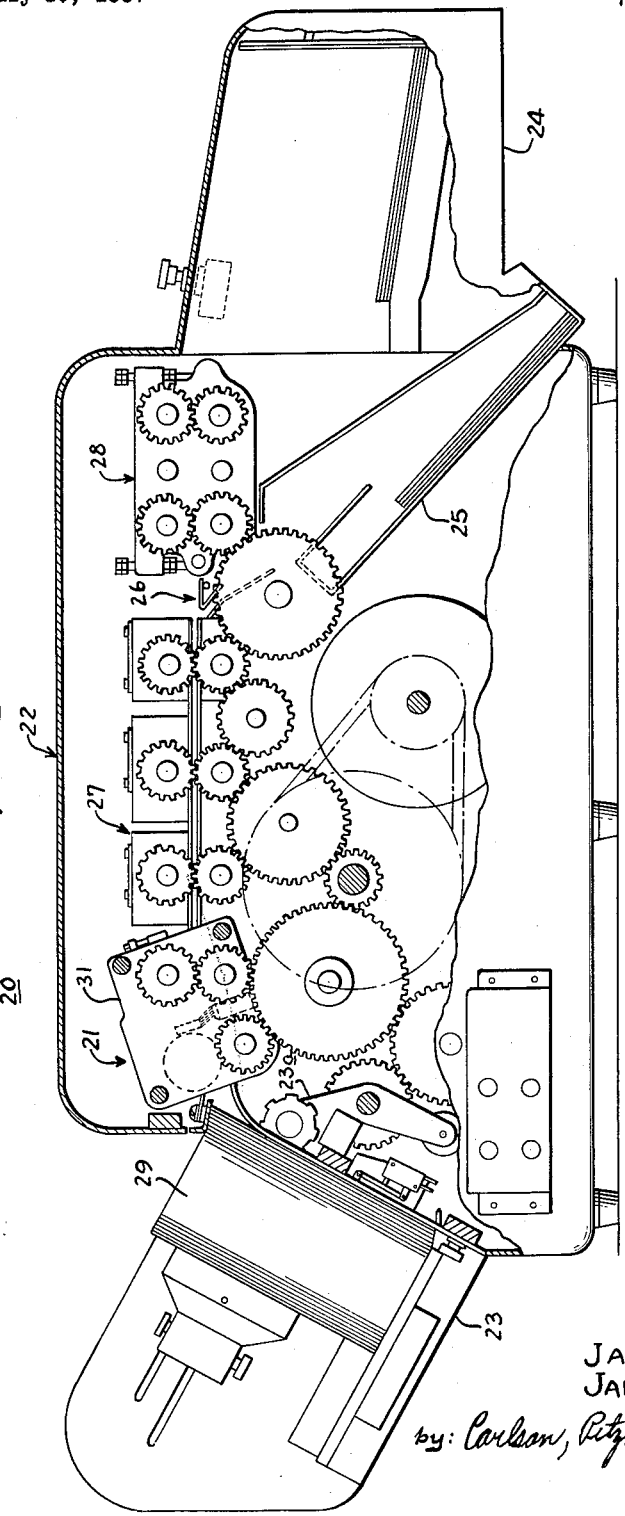

INVENTORS
JAMES L. QUINN
JAMES S. MENTZER
by: Carlson, Pitzner, Hubbard & Wolfe
ATTYS.

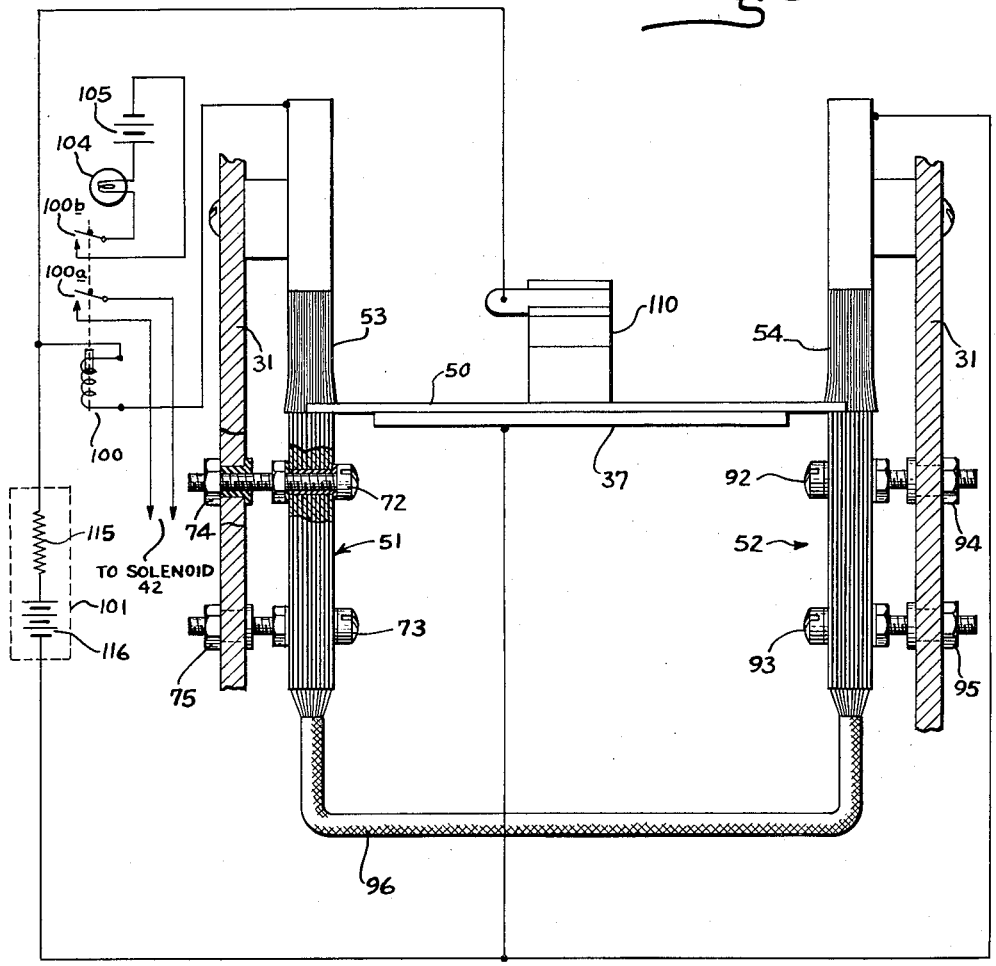

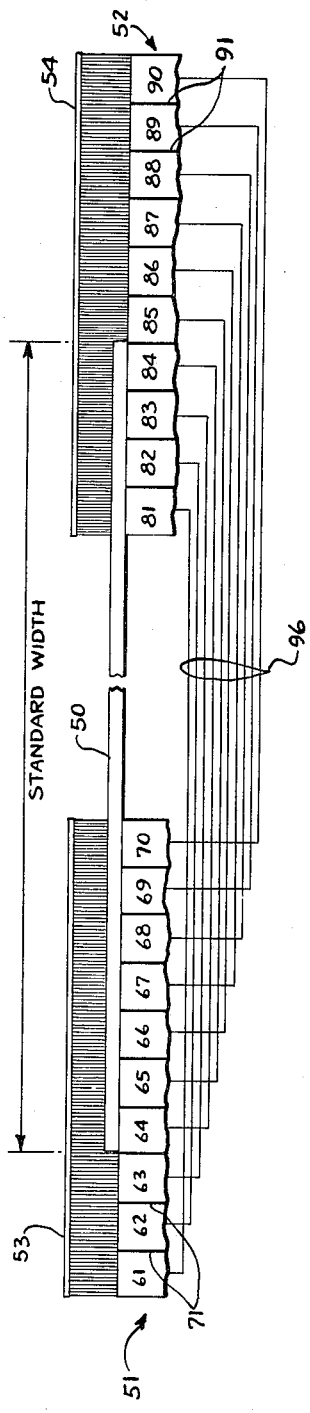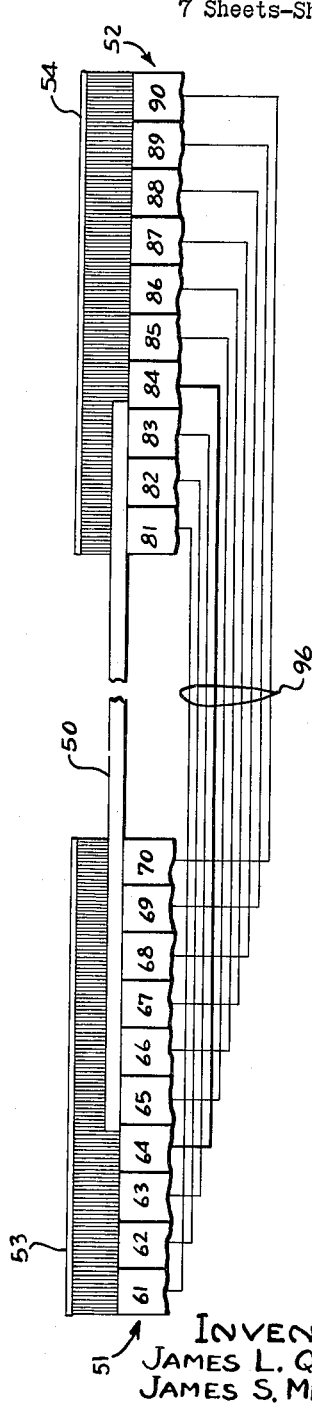

Oct. 3, 1961  J. L. QUINN ET AL  3,002,283
CARD WIDTH SENSING DEVICE
Filed July 10, 1957  7 Sheets-Sheet 5
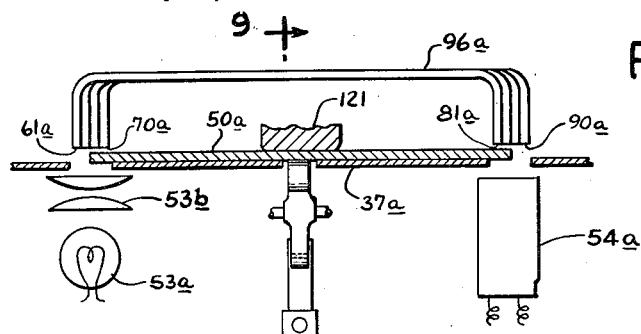
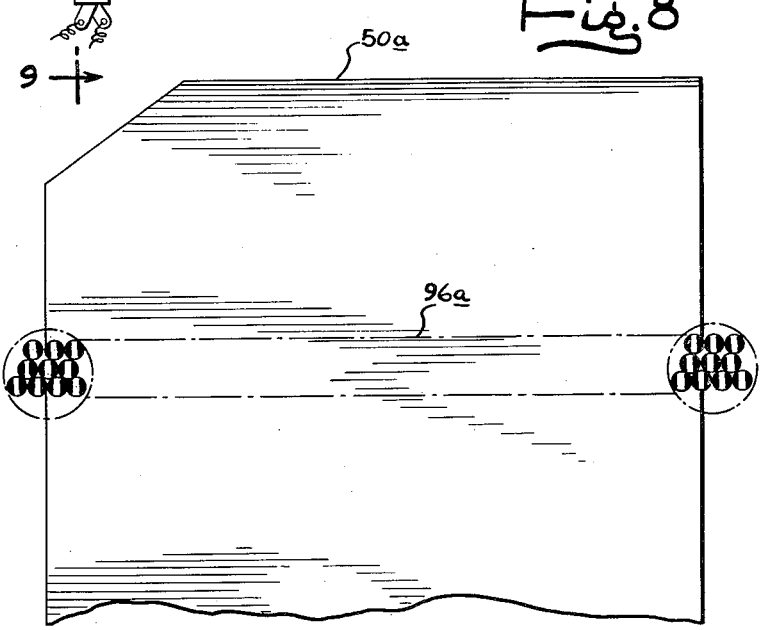
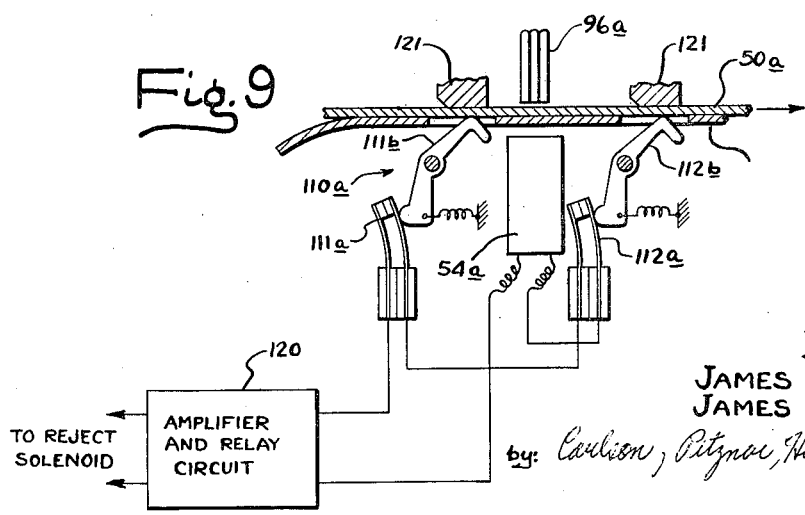
INVENTORS
JAMES L. QUINN
JAMES S. MENTZER INVENTORS
JAMES L. QUINN
JAMES S. MENTZER
by: Carlson, Pitzner, Hubbard & Wolfe
ATTYS

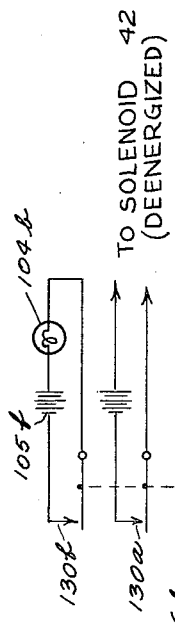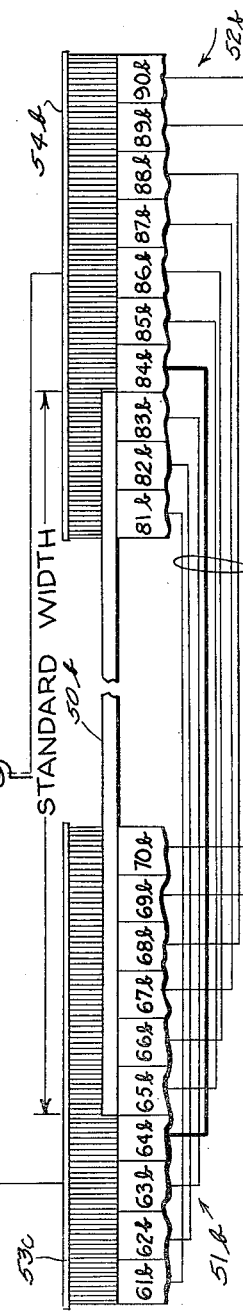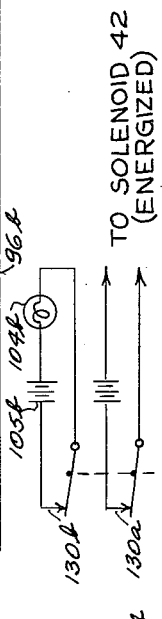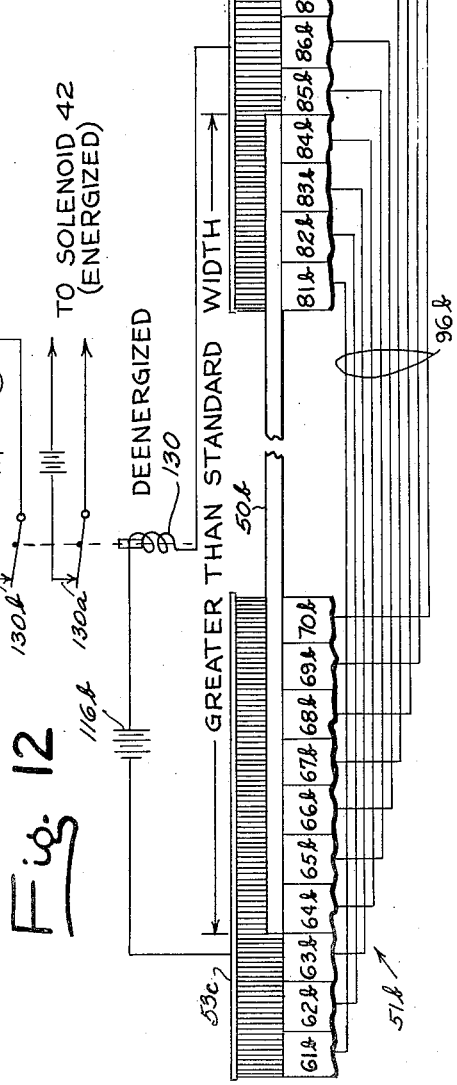

United States Patent Office 3,002,283
Patented Oct. 3, 1961

3,002,283
CARD WIDTH SENSING DEVICE
James L. Quinn, Chicago, and James S. Mentzer, Park Ridge, Ill., assignors to Cummins-Chicago Corp., Chicago, Ill., a corporation of Illinois
Filed July 10, 1957, Ser. No. 670,939
18 Claims. (Cl. 33—143)

This invention relates generally to apparatus for sensing the width of a passing card and more particularly to a device that will detect a card of non-standard width flowing in a passing stream of cards.

Automatic business machines depend primarily upon punched cards for the storage and processing of information. Such punched cards, or so-called IBM cards, have a series of holes arranged in coded patterns representing desired information. Accurate sensing of the particular pattern requires accurate positioning of the cards successively in a "reading" position within the machine. The reading position is established by supporting each card so that its lateral edges are alined with datum lines which are fixed for the handling of cards of a certain standard size.

Often, however, the cards are subject to hard usage before the time comes to extract their coded information. For example, their edges may be crumpled and torn by carrying in the pocket, or an entire edge, or portion of an edge, may be trimmed away by an automatic letter opener. Moreover, certain types of cutting operations used in blanking cards out of paper stock are not perfectly accurate or consistent so that the width dimension may be narrower or greater than standard by an excessive amount, i.e., an amount substantially in excess of the usual tolerances of plus 0.007, minus 0.003 inch. Since a card that is no longer of standard width cannot be accurately positioned and hence cannot be accurately "read," it is desirable to be able to detect and separate a card of non-standard width before it is fed to an information sensing apparatus of any kind. Since the cards are normally automatically fed in large numbers and in rapid succession, an automatic, rapidly acting and reliable width sensing apparatus is required.

An operative width sensing apparatus is shown in the copending application of James L. Quinn and James R. Duncan, Ser. No. 622,476, filed November 15, 1956, and assigned to the assignee of the present application. The apparatus as disclosed in such application employs a detector arrangement in which the output characteristics of two detector photocells are coordinated in a novel fashion and amplified for operation of a rejector mechanism producing rejection of a non-standard card. A level setting adjustment is provided so that compensation may be made from time to time for changes in the operating characteristics resulting from aging of the photocells and the like.

It is the primary object of the present invention to provide a width sensing device which has improved reliability and which is substantially independent of variations in the characteristics of the detector elements or other elements in the system. More specifically, it is an object to provide a width sensing device which does not require readjustment from time to time and in which the only critical adjustment is mechanical, to be made only once, namely at the time that the machine is initially put into operation, and in which such adjustment, once set, does not tend to get out of adjustment upon passage of time. It is a related object to provide a width sensing device which is more positive in operation than prior devices and in which individual detector elements have only two conditions of operation, "on" or "off," but which is nevertheless sensitive and rapidly responsive to small departures in width from the standard value.

It is a more detailed object to provide an improved width sensing means which is capable of measuring the width of cards passing rapidly in a steady stream in spite of variation in the lateral positioning of the cards and in spite of the fact that the cards may be skewed in one direction or the other relative to the path of movement.

Finally, it is an object of the invention in a preferred embodiment to provide a width sensing device which is not only simple and inexpensive, but direct acting, requiring no sensitive electronic amplifier and having a minimum of moving parts.

Other objects and advantages of the invention will become apparent upon reference to the attached detailed description and upon study of the drawings in which:

FIGURE 1 is a side view in partial section of a reconditioning machine for business machine cards employing the present invention.

FIG. 3 is a section taken along the lines 3—3 in FIG. 2, but including therewith a schematic wiring diagram.

FIG. 5 is a diagram similar to FIG. 2 but on a larger scale showing the passage of a standard width card.

FIG. 6 is a diagram similar to FIG. 5 but showing the making of contact upon passage of a card of sub-standard width.

FIG. 7 is a fragmentary view similar to FIG. 3 but showing a modified form of the present invention employing a bundle of light conducting rods.

FIG. 8 is a top view corresponding to FIG. 7.

FIG. 9 is a fragmentary section partially diagrammatic, taken along line 9—9 in FIG. 7 and showing the gate switches.

FIG. 11 is a diagram of the contacts and associated circuit employed for rejecting a card of greater than standard width but showing the condition of the circuit when passing a standard width card.

FIG. 12 is a diagram similar to FIG. 11 but showing the circuit actuated by passage of a card of greater than standard width.

Figure 4:
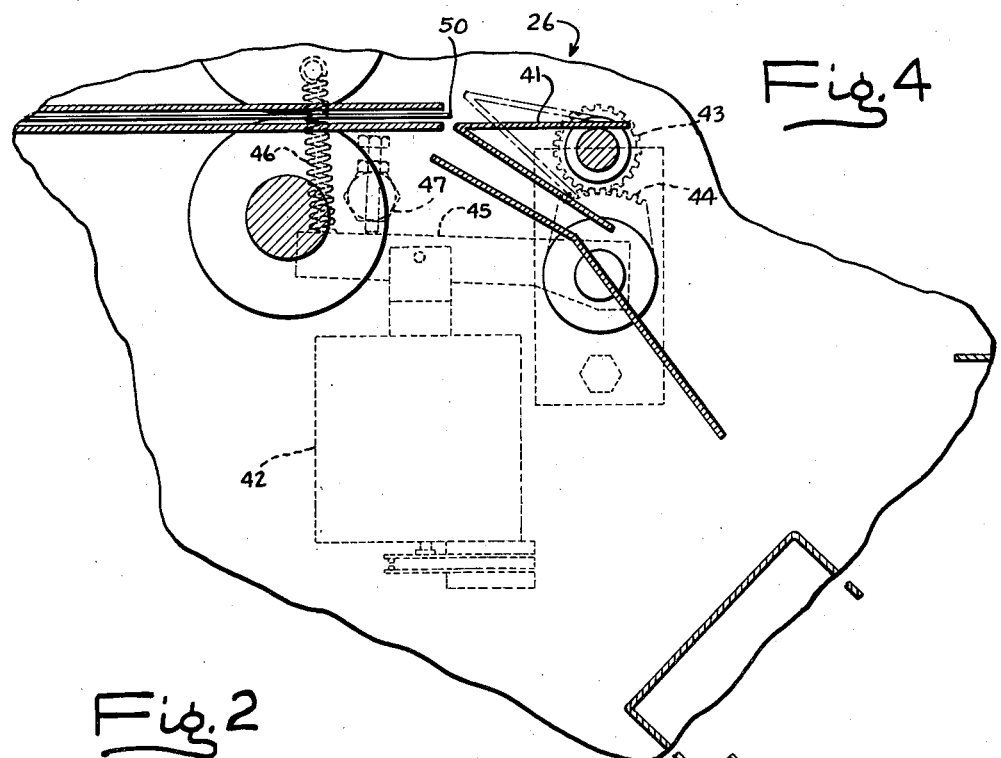
FIG. 4 is a fragmentary view showing the deflector arrangement used for deflecting cards into a reject hopper.

While the invention has been described in connection with certain preferred embodiments, it will be understood that we do not intend to limit the invention thereto but intend to cover such alternative and equivalent constructions as may be included within the spirit and scope of the appended claims.

Turning first to FIG. 1, there is shown a business machine 20 for handling punched cards and in which is measuring or with sensing unit 21 embodying the present invention has been installed. The particular machine shown by way of example is a punched card reconditioning machine known as a "Carditioner" which is full disclosed in the copending patent application Ser. 484,052, filed January 25, 1955, (now Patent No. 2,857,825), assigned to the assignee of the present invention. It will be understood that the width sensing device of the invention can be used in conjunction with any type of card handling apparatus, and its illustrated application to a reconditioning machine is only by way of example.

Briefly, the machine 20 shown in FIG. 1 comprises a main body portion 22 from which extends a card input hopper 23, having a feeding unit 23a, at the left of this figure and two card receiving hoppers 24, 25 respectively at the right hand or discharge end. The hopper 24 is the regular delivery hopper, and the hopper 25 is a reject hopper into which substandard cards are diverted. The sensing unit 21 is positioned to receive cards as they are fed from the feeding unit 23a. The sensing unit may include means for measuring the thickness as well as the width of the cards in accordance with the teachings of the above mentioned application Ser. 484,052 (now U.S. Patent No. 2,857,825). Since the thickness measuring function is described fully in the copending application, attention may be restricted to the width sensing elements to be described in detail. To separate the cards which are found not to be of the correct dimension, a rejecting unit 26 is provided. It will suffice to say that the rejecting unit is selectively operable under the control of the sensing unit 21 to either allow cards of standard width to pass through the machine so that they finally fall into the delivery hopper 24 or to deflect cards that are not of correct dimension downwardly into the reject hopper 25 from which they can be manually removed for duplication, trimming, stretching or other necessary correction.

In order to carry cards from the sensing unit 21 to the reject unit 26, a transport unit 27 is provided comprising a series of cooperating driven rolls. Cards that are found to be of standard width are allowed to pass from the transport until 27 through a conditioning unit 28 on their way to the delivery hopper 24.

In operation, a stack of cards 29 is placed in the hopper 23. The feeding unit 23a feeds cards one by one in rapid succession from the stack to the sensing unit 21 where their width is measured according to the invention set forth below. At this point the cards are traveling lengthwise at an appropriate velocity of 330 feet per minute. From the sensing unit 21 cards are fed in a steady stream, seriatim, by the transport unit 27 to the rejecting unit 26. Those cards which are found to be not of standard width are deflected from the stream by the rejecting unit 26 while the standard cards pass into the conditioning unit 28 to the delivery hopper 24.

The sensing unit 21 comprises a sub-frame 31 (FIGS. 1–3) which is adapted to support the entire assembly for easy mounting within the machine body. Journaled within the sub-frame are two sets of rollers 32, 33 and 34, 35. Rollers 32, 33 serve as "pull" rolls, that is, they draw a card into the machine that has been separated from the stack 29 by the feeding unit 23a. The rollers 32, 33 pull the card from the feeding unit around the curved bottom 36 of the hopper 23, driving it along a guide plate 37. The rollers 34, 35 engage the card as it moves along the guide plate 37 and propel it into the driven rolls of the transport unit 27.

For the purpose of deflecting cards not of standard width from a stream of cards flowing through the "Carditioner" unit, the rejecting unit 26 (FIG. 4) is provided with a pivoted vane type deflector 41 which is actuated into the dotted position by means of a solenoid 42. For coupling the solenoid to the vane, deflector gears 43, 44 are employed, the gear 43 being connected to the deflector and the gear 44 being connected to the solenoid for rocking movement by an arm 45. A spring 46 holds the arm upward against a suitable stop 47.

It will be apparent that under normal conditions, with the vane 41 lowered, the cards are allowed to pass to the delivery hopper 24. However, when the solenoid is energized, the arm 45 is pulled down accompanied by clockwise rotation of the deflector 41 into its upraised position so that the oncoming card is deflected downwardly into the reject hopper 25.

In accordance with the present invention two groups of detectors are used in the region of the paths of movement of the lateral edges of a transported card, with the detectors in each group being incrementally spaced in the "width" direction and with corresponding detectors in each group paired and spaced apart an amount which is slightly less than the width of a standard card so as to produce an output signal for actuating the deflector whenever a card of sub-standard width goes by. In the preferred embodiment shown in FIGS. 1 to 6, a typical card is indicated at 50, the first group of detectors is indicated at 51, and the second group of detectors at 52. Each of the groups of detectors has a corresponding brush electrode indicated at 53, 54 respectively. Taking the detector 51 and the brush 53 by way of example, it will be noted that they straddle the edge of the card 50 so that passage of the card cuts off electrical contact between the brush electrode and a portion of the detector electrodes. Viewed in another way, the detector electrodes, together with their brushes, may be considered as card presence-sensing means or elements. Each sensing element has two states, i.e., it has either very high or low conductivity from the associated brush depending upon whether a card is clear of or registered over that element. Conveniently, the group of detectors 51 may be made up of a stack of conducting strips 61–70 (FIG. 5) separated by thin sheets of insulating material 71. The assembly or stack thus formed may be cemented together under pressure or may be tightly clamped by means of insulated through-bolts 72, 73. Turning to the group of detectors 52, the construction is identical to that previously described, comprising a series of thin metal strips 81—90 separated by sheets of insulation 91 and supported and clamped by bolts 92, 93.

For the purpose of adjusting the lateral position of each of the groups of detectors, the same are supported on the side plates of the measuring unit 31 by threaded adjusting means, for example, the threaded captive nuts 74, 75 and 94, 95 respectively. The sensing elements or contacts from each group are paired with those of the other group, 61, 81; 62, 82; etc. The contacts of each pair are, in accordance with the invention, spaced apart an amount which is slightly less than the standard width of a business machine card and interconnected by individual wires bundled into a cable 96.

In carrying out the invention, means are provided to signal when both sensing elements of any pair are simultaneously in a predetermined combination of their possible states. The two contacts of a given pair may be (a) both in the "card present" state or electrically isolated from their associated brushes, (b) both in the "card absent" state or electrically connected to their associated brushes, or (c) one in the "card absent" state and the other in the "card present" state. In the present instance, the signalling and rejection of a card which is too narrow is produced when combination (b) obtains, that is, when both sensing elements of any pair are in the "card absent" state. For this purpose, a signal source, such as a supply voltage means or battery 101, and a signal receiving device, such as a relay 100, are connected in series between the brush electrodes 53, 54. Because the several sets of series switches formed by the pairs of contacts and their brush electrodes are in parallel between the brushes, the brushes are electrically connected to one another whenever both sensing elements or contacts of any pair are in the "card absent" or high conductivity state. This permits current flow to energize the relay 100, which in this instance, signals that the card being sensed is of substandard width. To reject the defective card, the relay 100 has normally open contacts 100a connected in series with the solenoid 42 and contacts 100b which are connected in a separate circuit providing visual indication that the control circuit has operated. The latter circuit includes a reject indicator lamp 104 and a suitable source of current 105.

Figure 2:
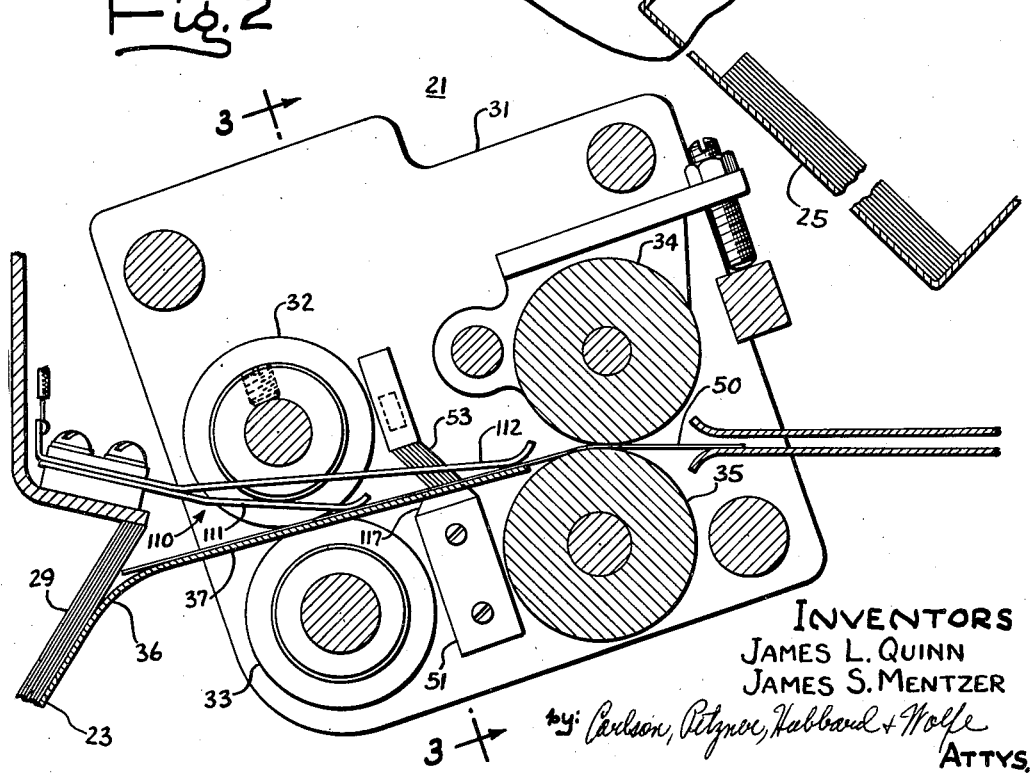
FIG. 2 is a transverse sectional view of a measuring unit including a set of width sensing detector elements.

In accordance with one of the aspects of the invention, means are provided for turning the width sensing arrangement "on" only during the time that the central portion of a business machine card is passing through the width sensing unit and for disabling the device at all other times. To accomplish this, a gate switch 110 is provided having leaf spring contacts 111, 112 arranged on opposite sides of the brush location (FIG. 2). These contacts make electrical grounding contact with the plate 37 which supports the central portion of the card. In accordance with one of the aspects of the invention, the gate switch 110 is shunted directly across the output terminals of the power supply 101, and the power supply is provided with sufficient internal resistance so that its terminal voltage drops to zero when the short circuiting occurs. In the present instance, the internal resistance is indicated at 115 in series with a source voltage 116. The resistance of the resistor 115 is sufficiently high so that the current is limited to a safe value when short circuiting occurs, yet sufficiently low as to provide for rapid and positive operation of the relay 100 under open circuit conditions.

Since conventional business machine cards have one corner clipped to provide an easy visual check on card orientation, the contacts 111, 112 of the gate switch are spaced apart a sufficient amount so that the short circuit is not broken until the central or body portion is under the brush electrode, i.e., until the leading edge of the card arrives at the second contact 112. Similarly, short circuiting by switch contact 111 occurs to disable the sensing means before the tail end portion of the card arrives at the brush electrode. The total spacing between the contacts 111, 112 may be on the order of ½ inch so that width sensing occurs over the central portion of a card and not for a ½ inch band at the leading and trailing edges.

In a practical embodiment of the apparatus described above, each stack or group of detector elements may consist of flat brass strips approximately 0.006 inch in thickness and separated by layers of insulation having a thickness of 0.005 inch. A total of ten detector or contact elements may be employed in each stack, as shown, although it will be apparent to one skilled in this art that a greater or lesser number may be used without departing from the present invention. At the upper end of the stack, the edges may be tapered or chamfered as indicated at 117 so that the oncoming card is guided smoothly over the contacting edges.

Referring to the brush construction in more detail, the bristles may be made of Phosphor bronze wire of 0.004 inch dia. with a total number of bristles many times in excess of the number of detectors and with the bristles spread across a width which is slightly greater than the width of the detector stack. Moreover, the bristles are inclined downwardly at an angle of approximately 20°–45° in a direction away from the oncoming cards, not only to facilitate entry of the cards under the bristles but also to take advantage of the cantilever springiness inherent in each bristle. Since the bristles are both fine and numerous there is no dependence upon a single bristle for making contact. Provided that the bristles are arranged substantially parallel to one another, they will fall off the edge of the card closely adjacent the edge to provide a high degree of sensing accuracy.

In order to understand the operation of the device upon passage of a card of standard width and sub-standard width, reference is made to FIGS. 5 and 6. Taking the standard width condition first, it will be noted in FIG. 5 that corresponding contacts in each stack are connected together and spaced apart an amount which is just slightly less than the width of a standard card. Thus, under normal conditions, at least one of the sensing elements of each pair will be in "card present" condition, i.e., isolated from its associated brush. Each of the individual detector circuits will be open-circuited to leave the two brush electrodes electrically disconnected during passage of a card and the associated control circuit will not be actuated. Let it be assumed, however, that a card of sub-standard width passes through the machine having a width which is, say, 1/32 inch less than standard as a result of having been inadvertently trimmed in a letter opening machine. If the card is laterally positioned as shown in FIG. 6, the sensing elements of one pair will be placed in a predetermined combination of the two possible states, i.e., both will be in the "card absent" condition. As shown by way of example in FIG. 6, the circuit will be completed between contacts 64 and 84 (shown bold) by reason of the brush wires in contact therewith. Such contact is, however, ineffective until the card enters the width detector sufficiently to break both of the gate contacts 111, 112. Until the time that both of such contacts are lifted from the guide plate 37, the power supply 101 is short circuited and hence incapable of operating the relay 100. However, when the contacts of the gate switch are broken upon arrival of the central portion of the card, the short circuit is removed and the receiving device or relay 100 is energized by current flow through the brush electrode circuit. This causes closure of the contacts 100a thereby to operate the deflector solenoid so that the card is deflected downwardly into the reject hopper 25.

With regard to timing, when the cards flowing through the machine are well spaced from one another a simple relay circuit such as that shown is adequate. However, when the cards are closely spaced and pass at high speed any suitable means may be provided for insuring that the deflector 26 when actuated by a substandard width card, is effective to deflect such card and only such card into the reject hopper, and for this purpose a timing circuit may be used such as disclosed and claimed in Quinn and Duncan application Serial No. 577,723 (now U.S. Patent No. 2,903,133, issued Sept. 8, 1959) to which reference is made.

While the operation with a substandard card has been discussed in connection with contacts 64, 84, it is one of the important features of the present device that accurate measurement of width occurs regardless of the precise lateral positioning of a card and independently of minor amounts of skew. It is therefore unnecessary to direct the card against any referencing datum surface or abutment in taking a measurement. On the contrary, the cards may be allowed to take any "natural" position within limits, and the thickness of each stack of detectors will normally be made slightly wider than the range of expected variation in positioning. The fact that the cards originate in an alined stack fed from the supply hopper through consistently operating feeding means tends to reduce the variation to a small fraction of an inch, say, on the order of 1/16 of an inch. Consequently, adequate control may be achieved using a stack of detector contacts having a thickness on the order of 1/8 to 1/4 inch.

It will be apparent that once the position of each of the stacks is adjusted by the adjusting nuts 74, 75 and 94, 95, it will be unnecessary, in general, to disturb such adjustment during the life of the machine. The arrangement is positive, having only two conditions, "off" for standard cards, and "on" for sub-standard. There is no necessity to set operating level or any other adjustment as the machine is used.

*Arrangement using photocells*

While the invention has been described above as embodied in an arrangement in which the detectors are formed by a stacked series of electrical contacts, it will be apparent to one skilled in the art that the invention in its broader aspects is not limited to the use of contact groups along the lateral edges of the card; instead, the paired sensing elements or detectors may be in the form of narrow light conducting paths extending from a source to a receiving photocell. More specifically, in accordance with one of the aspects of the invention, we provide light conducting paths utilizing a bundle of light conducting rods formed of Lucite or similar efficient light conducting material.

Referring to FIGURES 7–10 of the drawings, elements which are analogous or similar in function to the elements described in the preceding embodiment carry the same reference numeral with the subscript "a." Arranged above the passing card 50a is a bundle of Lucite rods 96a. These Lucite rods 96a are formed to "U" shape with the opposite ends thereof being presented downwardly in the region of passage of the lateral edges of the card. The rods comprising the bundle 96a are, in the present embodiment, ten in number having light inlet faces 61a—70a and light outlet faces 81a—90a respectively. These faces form card presence-sensing elements having two possible states. Each sensing element is of low signal or light conductivity when in the "card present" state, i.e., masked by a passing card. It is of high signal or light conductivity when in the "card absent" state.

For the purpose of supplying light to the inlet faces of the rods, a signal or light source 53a is used, with the light preferably being transmitted through a pair of condensing lenses 53b, so that, absent a card, all of the light inlet faces are illuminated at the same intensity.

For the purpose of picking up the light transmitted to the rods, a signal receiving device or photocell 54a is provided which is preferably of the sensitive lead-sulfide type. The output of the photocell is fed into an amplifier 120 which in turn is connected to a solenoid 42 in the deflector unit.

It will be apparent to one skilled in the art from what has been said thus far that the ends of the Lucite rods are spaced apart by an amount which is slightly less than the width of a standard card so that when a standard card passes through the machine, the light path will be interrupted either along one edge or along the other with respect to each of the rods so that no light will reach photocell 54a. That is, at least one of each pair of sensing elements represented by the rod faces will be in "card present" state or masked by the card and non-transmissive to light. On the other hand, when the paired sensing elements or faces at opposite ends of any rod are in the "card absent" state, i.e., conductive to light, the receiving device or photocell 54a will be energized.

In order to improve the light transmission qualities of each of the rods while reducing the incremental spacing between them, the rods are preferably bundled so that their faces lie in a two dimensional pattern with the faces of each of the rods being masked along the lateral edges to define a narrow light conducting slit. The arrangement is such, as clearly shown in FIG. 10, as to cause the light conducting slits to be incrementally offset with respect to one another. In a practical case, incremental spacing of as little as $1/32$ inch may be secured with relatively large and efficient rods having a diameter of $3/32$ inch.

Prior to discussing the operation upon passage of a card of sub-standard width, attention may be given to the gating arrangement set forth in FIG. 9. The gate switch, generally indicated at 110a, includes a first contact 111a operated by a lever 111b and a second contact 112a having a lever 112b. The contacts 111a, 112a, are, as shown, connected in series with the output of the photocell 54a so that no signal is supplied to the amplifier 120 in the absence of a card spanning both of the levers. When a card enters the measuring station, lever 111b is operated, closing contact 111a. However, it is not until the card strikes the second lever 112b, closing contact 112a, that the circuit is closed, thereby conditioning the sensing arrangement for operation. Back-up members 121 may be provided if desired to hold the card against the contact levers.

Figure 10:
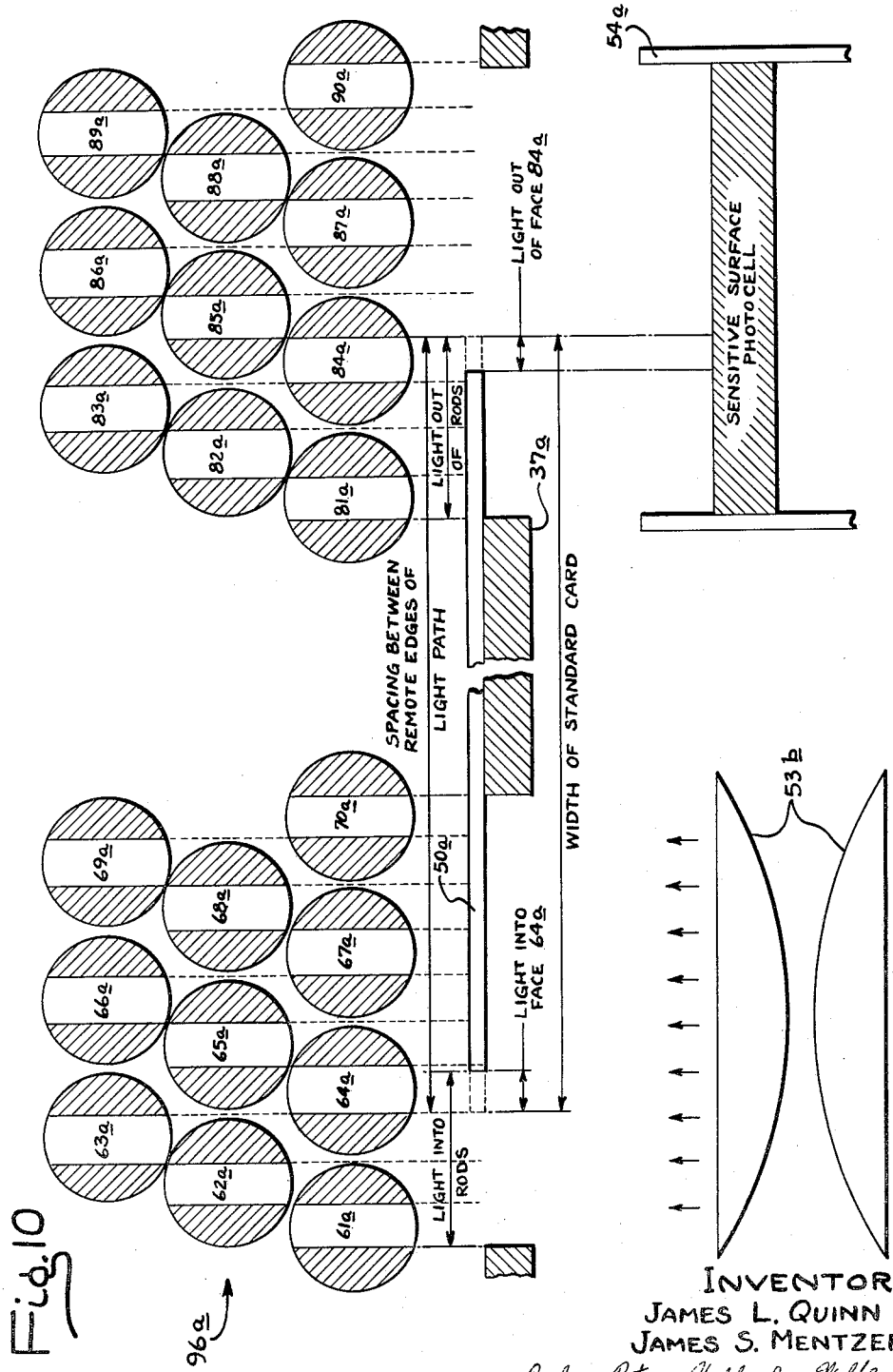
FIG. 10 is an enlarged diagrammatic view showing the ends of the bundle of light conducting rods relative to the region of passage of the lateral edges of a card.

Referring to FIG. 10, which is diagrammatic, a card of standard width is indicated by the dot-dash outline, the faces of each rod being spaced apart an amount which is slightly less than the standard width. Under such conditions it will be seen that the spacing between the remote edges of each of the light paths substantially equals the width of the standard card. Thus, when a standard card is fed through the machine, the light path in each of the rods will be cut off at either one face or the other so that the photocell remains dark. However, when a card of sub-standard width passes through the machine, and the sensing elements of any pair are in that predetermined combination of states where both sense the absence of a card, a light path through at least one of the rods is completed. Thus it will be seen that in the present instance, the light passing into the face 64a emerges at the face 84a striking the sensitive surface of the photocell, thereby actuating the amplifier 120 and causing the deflector solenoid 42 to be actuated.

It will be apparent to one skilled in the art that the light source should be sufficiently bright and the photocell sufficiently sensitive so that the light transmitted by a single one of the rods is more than sufficient to produce a positive output signal at the output terminals of the amplifier. This can be accomplished in a practical case without necessity for high values of gain. Stated in other words, the gain of the amplifier may be sufficiently low so that extraneous noise picked up by the amplifier input leads will be ineffective to actuate the connected relay or solenoid. If a high output photocell is used with a sensitive relay, the amplifier may, if desired, be dispensed with.

The present arrangement employing photocells is to be contrasted with that disclosed in the copending application 622,476 mentioned above, which depends upon percentage net increase or decrease in the transmitted light and which is therefore affected by variations in the response characteristics of the photocells, variations in the gain of the amplifier, and differential variations in the exciting lamps. The present scheme is unaffected by variations in these variables. It is responsive to simply the presence or absence of light and not to gradations in amount of light. Stated in other words, the present arrangement employs a photocell in a "two-condition" or "on-off" arrangement in which the magnitude of the light or its equivalent electrical signal is unimportant and may vary over wide limits without affecting the positiveness of operation of the device.

To enlarge upon the above, passage of a card of standard width is effective to positively cut off all light flow to the photocell, and consequently, under such conditions, the input and hence the output, of the amplifier, is zero. Where a card is of sub-standard width, as little as $1/32$ inch, the light conducting slit in at least one of the Lucite rods is uncovered, causing the photocell to be actuated to a degree which is sufficient to positively effect operation of the deflector solenoid. Where the card is only a shade less than standard width, it is conceivable that the photocell may not be actuated to a degree sufficient to produce operation of the solenoid, but in such instance the card is, in any event, not sufficiently sub-standard as to cause malfunctioning of a business machine. On the other hand, cards which are excessively sub-standard will simply produce an excessive voltage at the output of the amplifier which is of no significance to the operation of the deflector. It will be apparent from what has been said that substantial variations may take place within the control circuit over the years during which the machine is used without affecting the reliability of operation and without requiring adjustment or resetting of the amplifier gain. Hence the reliability is equivalent to that of the contact arrangement previously discussed while possessing the additional advantage of lack of contact wear.

It has been assumed above that the card is orientated parallel to its line of travel. The operation is not dependent upon such orientation, however, and the device has been found to work equally well for all ordinary encountered amounts of skew.

Also, while the invention has been discussed in connection with a card which is uniformly narrow by reason of having been trimmed by an envelope opener or the like, it will be apparent that the device is equally capable of detecting and diverting cards which are ragged or notched along the lateral edges. Thus, notches of reasonable length are effective to operate the associated relay and solenoid without any special circuit being interposed. If desired, the sensitivity to small notches may be increased by use of a pulse stretching arrangement.

*Detection of cards of greater than standard width*

The invention has been described above in connection with detection of cards of sub-standard width since this situation is more commonly encountered in practice as a result of mistreatment of cards. However, it will be understood that the invention is not limited thereto but includes the concept of detecting cards which are of greater than standard width as a result of inaccurate cutting of the blank or for any other reason.

Thus, in accordance with the invention, two groups of detectors or sensing elements are employed in the region of the paths of movement of the lateral edges of a transported card, with the detectors in each group being incrementally spaced in the width direction and with corresponding detectors in each group paired and spaced apart an amount which is slightly greater than the width of a standard card and with means for responding to the presence of a card at paired detectors. Each detector or sensing element may have either of two states, a "card absent" or "card present" state. Means are provided to energize a signal receiving device when the two elements of any pair are in a predetermined one of the two possible states.

Referring to FIG. 11, the sensing elements are here shown as contacts indicated at 61b—70b on the left hand side and 81b—90b at the right hand side, corresponding contacts in each series being connected together via a cable 96b. A simplified control circuit may be used since gating is not necessary. As shown, the two brushes 53c, 54b are connected in series with a signal receiving device or relay 130 having normally closed contacts 130a and 130b and a battery or other signal source 116b. The contacts 130a are coupled to the deflector solenoid 42 while the contacts 130b are connected to a visual signalling circuit consisting of a lamp 104b and battery 105b.

It will be noted from FIG. 11 that the two sensing elements or detectors for each pair are spaced apart an amount which is slightly greater than the width of a standard card. With the card 50b in the lateral position shown it will be noted that detector contacts 64b, 84b are both unmasked by the card and thus contacted by the brushes 53c, 54b, the circuit between the contacts being completed through the boldly indicated wire. Since this completes the control circuit, the relay 130 is energized and the contacts 130a, 130b thereon are held open so that there is no output signal. Regardless of the lateral positioning of the card, at least one pair of detector contacts will be unmasked so that the circuit remains unchanged as long as standard cards go by. So long as both sensing elements of any pair are in the "card absent" state, the relay 130 will be energized and no output signal supplied through the contacts 130a. It may be noted that the circuit remains in the "no output" condition even when there are no cards in the machine, thus no gating switch need be used. The relay 130 is "normally energized" and deenergization thereof occurs when a card of improper width is sensed. The relay 100 (FIG. 3) by contrast is "normally deenergized" and is energized when a card of defective width is sensed.

However, when a card of greater than standard width is present (FIG. 12), at least one of each pair of corresponding contacts is masked by the card so that the circuit between the brushes is broken, with the result that the relay 130 drops out, permitting the normally closed contacts 130a associated therewith to close and operating the solenoid 42. This condition is shown in FIG. 12 where the card 50b is sufficiently wide as to cover the paired contacts 64b, 84b, breaking the circuit between them. The condition shown in this figure obtains for all cards having greater than standard width and in all lateral positions within the machine, provided only that the width exceeds standard by more than a minimum amount which is a practical case, using the contact dimensions given above, may be on the order of 0.012 inch.

Where it is desired to detect both sub-standard and greater than standard width conditions, two separate detector installations will be necessary, but this is not a particular problem because of the inherent simplicity and compactness. It will be apparent from what has been said that the control circuits may be connected to the same diverter or, if desired, individual diverters may be employed so that the diverted cards are collected in separate groups depending upon whether they are "over" or "under" in dimension.

Preferably, one of the width sensing arrangements disclosed herein may be installed in a "Carditioner" or other business machine when such machine is initially constructed. However, it is one of the features of the present invention that the width sensing feature may be added to existing machines in the field without requiring any substantial reconstruction and without sacrificing the reliable operating characteristics which are inherent in both of the embodiments disclosed.

While the invention has been described in connection with automatic deflection of a card of sub-standard width into reject hopper, it will be apparent that the present invention is not limited thereto, but would include the signalling of the passage of a sub-standard card simply by the lighting up of an indicator lamp or the like.

In the following claims, it will be understood that the term "width" applies to that dimension of the card which is perpendicular to its path of movement.

W claim as our invention:

1. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presence-sensing elements to form a plurality of pairs of elements, means mounting said elements with those of each pair spaced apart in a direction transverse to said path by a distance which differs slightly from the nominal width of a business machine card, each of said elements having two conditions depending respectively upon whether a card is substantially clear of or registered with that element, a signal receiving device, and means for energizing said device when the two elements of any pair are simultaneously in a predetermined one of said two conditions.

2. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presence-sensing elements to form a plurality of pairs of elements, a signal source and receiving device, means connecting each pair of sensing elements individually in series between said source and receiver, means mounting said elements with those of each pair spaced apart in a direction transverse to said path by a distance which differs slightly from the nominal width of a business machine card, each of said elements having conditions of high and low signal conductivity depending upon whether a card is substantially clear of or registered with that element, whereby said receiver is energized when the two elements of any pair are simultaneously in a high conductivity condition.

3. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one said second series of card presence-sensing elements to form a plurality of pairs of elements, means mounting said elements with those of each pair spaced apart in a direction transverse to said path which is slightly less than the nominal width of a business machine card, each of said elements having two conditions depending respectively upon whether a card is substantially clear of or registered with that element, a signal receiving device, and means for energizing said device whenever the two elements of any pair are simultaneously in a predetermined one of said two conditions while a card is passing said elements.

4. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presence-sensing elements to form a plurality of pairs of elements, means mounting said elements with those of each pair spaced apart a distance which is slightly less than the standard width of a business machine card so that upon passage of a card of standard width at least one element of each pair will sense the presence thereof and so that upon passage of a card of slightly less than standard width neither of the elements of a pair will sense the presence thereof, a signal receiving device, and means for energizing said device when neither of the elements of any pair senses the presence of a card which is passing said sensing elements.

5. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presence-sensing elements to form a plurality of pairs of elements, means mounting said elements with those of each pair spaced apart a distance which is slightly less than the standard width of a business machine card so that upon passage of a card of standard width at least one element of each pair will sense the presence thereof and so that upon passage of a card of slightly less than standard width neither of the elements of a pair will sense the presence thereof, means for signalling when neither of the elements of any pair senses the presence of a card, and means for disabling said last-named means except when a card is passing said sensing elements.

6. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presence-sensing elements to form a plurality of pairs of elements, means mounting said elements with those of each pair spaced apart in a direction transverse to said path which is slightly greater than the nominal width of a business machine card, each of said elements having two conditions depending respectively upon whether a card is substantially clear of or registered with that element, a signal receiving device, and means for energizing said device whenever the two elements of any pair are simultaneously in a predetermined one of said two conditions while a card is passing said elements.

7. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presence-sensing elements to form a plurality of pairs of elements, means mounting said elements with those of each pair spaced apart a distance which is slightly greater than the standard width of a business machine card so that upon passage of a card of standard width both elements of one pair will sense the absence thereof and so that upon passage of card of slightly greater than standard width at least one of the elements of any pair will sense the presence thereof, a signal receiving device, and means for energizing said device when neither of the elements of any pair simultaneously sense the presence of a card.

8. Apparatus for detecting business machine cards of improper width dimension comprising, in combination, means for conveying cards seriatim along a predetermined path, a first series of card presence-sensing elements mutually isolated and spaced closely adjacent one another transversely with respect to the path of movement and in the region of passage of one lateral edge of the cards, a second series of transversely spaced card presence-sensing elements mutually isolated and arranged in the region of passage of the opposite lateral edge of the cards, each of said first series of card presence-sensing elements being assigned to a corresponding one of said second series of card presense-sensing elements to form a plurality of pairs of elements, a signal source and receiving device, means connecting each pair of sensing elements individually in series between said source and receiving device, means mounting said elements with those of each pair spaced apart a distance which is slightly greater than the standard width of a business machine card so that upon passage of a card of standard width both elements of one pair will sense the absence thereof and so that upon passage of a card of slightly greater than standard width at least one of the elements of any pair will sense the presence thereof, each of said elements having conditions of high and low signal conductivity depending upon whether a card is clear of or registered with that element, so that said receiving device is energized when the elements of any pair are simultaneously in a high conductivity condition indicative that the card passing the elements is not of excessive width.

9. Apparatus for detecting business machine cards of improper width dimension comprising, in combination, means for conveying cards seriatim along a predetermined path; a first plurality of switches including a first stack of electrical contacts mutually electrically insolated and spaced closely adjacent one another transversely with respect to the path of movement in the region of passage of one lateral edge of a card, and a first common brush electrode having yieldable members disposed to electrically engage all of said first contacts and to be separated from each contact by intervention of a passing card; a second plurality of switches including a second stack of electrical contacts mutually electrically isolated and transversely spaced in the region of passage of the opposite edge of a card, and a second brush electrode having yieldable members disposed to electrically engage all of said second contacts and to be separated from each contact by intervention of a passing card; and means electrically connecting each of said first contacts with one of said second contacts to form interconnected contact pairs, means mounting each pair of contacts spaced apart transversely of the card path by a distance which differs slightly from the standard card width, so that said first and second brush electrodes are electrically connected whenever a card is not disposed between either of any pair of contacts and the yieldable members associated therewith.

10. The combination set forth in claim 9 further characterized by a signal source and a receiving device connected in series between said first and second brush electrodes.

11. The combination set forth in claim 9 further characterized in that the transverse spacing of each said pair of interconnected contacts is slightly less than the standard card width, so that said first and second brush electrodes are electrically connected while a card is passing thereby only if that card is less than the standard width.

12. The combination set forth in claim 9 further characterized in that the transverse spacing of each said pair of interconnected contacts is slightly greater than the standard card width, so that said first and second brush electrodes are electrically disconnected while a card is passing thereby only if that card is greater in width than the standard card width.

13. The combination set forth in claim 11 further characterized by a signal source and a receiving device connected in series between said brush electrodes, and means for preventing energization of said device except when a card is passing said first and second stacks of contacts, whereby said receiving device is energized only if a card of substandard width passes between said first and second stacks of contacts and their corresponding brush electrodes.

14. The combination set forth in claim 12 further characterized by a signal source and a receiving device connected in series between said brush electrodes, whereby said device is normally energized and is deenergized when a card of excessive width passes between said first and second stacks of contacts and their corresponding brush electrodes.

15. Apparatus for detecting business machine cards of improper width dimension comprising, in combination, means for conveying cards seriatim along a predetermined path, a plurality of light-conductive rods disposed with the faces of their opposite ends parallel to the plane of a card moving along said path and respectively in the regions of passage of the two lateral edges of the card on transversely opposite sides of the card path, the opposite end faces of each said rod being spaced apart transversely of said path by a distance which differs slightly from the standard width of a card, a light source mounted to illuminate the faces at one end of each rod and to be masked therefrom by an intervening card traveling said path, and a photocell mounted to receive light from the opposite end of each rod and to be masked therefrom by an intervening card traveling said path, so that said photocell is energized by received light passed from said source through one of said rods whenever a card is not masking either end of that rod.

16. The combination set forth in claim 15 further characterized in that the transverse spacing between the opposite end faces of each said rod is slightly less than the standard width of a card.

17. The combination set forth in claim 16 further characterized by an output circuit including said photocell and means for completing said circuit only when a card is passing the faces of said rods, so that said photocell is energized by light and current flows in said output circuit only when a card of substandard width is passing said rod faces.

18. The combination set forth in claim 15 further characterized in that the transverse spacing between the opposite end faces of each said rod is slightly greater than the standard width of a card, so that said photocell is energized by light except when a card of excessive width is passing said end faces.

References Cited in the file of this patent

UNITED STATES PATENTS

| | | |
|---|---|---|
| 981,552 | Gatz | Jan. 10, 1911 |
| 1,688,308 | Harding | Oct. 16, 1928 |
| 1,988,702 | Reeve | Jan. 22, 1935 |
| 1,998,950 | Cockrell | Apr. 23, 1935 |
| 2,085,671 | Powers | June 29, 1937 |
| 2,120,369 | Mills | June 14, 1938 |
| 2,138,645 | Rey | Nov. 29, 1938 |
| 2,256,595 | Metcalf | Sept. 23, 1941 |
| 2,367,513 | Malhiot | Jan. 16, 1945 |
| 2,415,177 | Hurley | Feb. 4, 1947 |
| 2,630,043 | Kolisch | Mar. 3, 1953 |
| 2,669,354 | Perren | Feb. 16, 1954 |
| 2,730,807 | Collins | Jan. 17, 1956 |
| 2,740,520 | Calvin | Apr. 3, 1956 |
| 2,742,150 | Rendel | Apr. 17, 1956 |

FOREIGN PATENTS

| | | |
|---|---|---|
| 25,676 | Great Britain | 1903 |
| 1,138,405 | France | June 13, 1957 |